United States Patent Office 3,554,983
Patented Jan. 12, 1971

3,554,983
POLYESTERAMIDES PREPARED FROM CAPROLACTONE HEXAMETHYLENE DIAMINE AND A MIXTURE OF ISOPHTHALIC AND TEREPHTHALIC ACIDS
Isaac Goodman and Neville Robert Hurworth, Runcorn, England, assignors to Imperial Chemical Industries Limited, London, England, a corporation of Great Britain
No Drawing. Continuation-in-part of application Ser. No. 538,545, Mar. 30, 1966, now Patent No. 3,475,385, dated Oct. 28, 1969. This application July 26, 1968, Ser. No. 747,803
Claims priority, application Great Britain, Apr. 2, 1965, 14,106/65
Int. Cl. C08g 20/30
U.S. Cl. 260—78
11 Claims

ABSTRACT OF THE DISCLOSURE

Polyesteramides prepared from caprolactone, hexamethylene diamine, and a mixture of isophthalic acid and terephthalic acid, said polymers being useful in the form of molding plastics.

---

This application is a continuation-in-part of our application Ser. No. 538,545 filed Mar. 30, 1966, now U.S. Pat. 3,475,385.

This invention relates to polyesteramides.

Our invention provides solid polyamides of the kind derived notionally from the polycondensation of hexamethylene diamine with a mixture of iso- and terephthalic acids but which have been modified by the introduction of alkylene carboxylate groups derived from a lactone. The products so obtained have unexpectedly been found to be generally transparent, tough and often amorphous moulding plastics of which the softening point varies with the ester content.

According to the present invention we provide polyesteramides which are solids melting or softening above 60° C. and containing macromolecular chains consisting essentially of ester units of the structure —O—(CH$_2$)$_5$—CO—, diamine units of the structure —NH—(CH$_2$)$_6$—NH— and dicarbonyl units of the structure

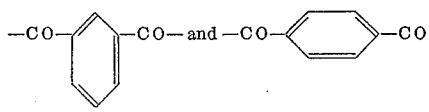

there being a total of from 2 to 2000 of said diamine and said dicarbonyl units for every 50 ester units in the polymer chains.

By melting we mean losing crystallinity as indicated by loss of birefringence in a sample heated at a rate of 1° C. per minute and observed under a polarising microscope. By softening we mean the losing by a solid of its form by collapse into liquid state, as observed during visual microscopic examination of a sample being heated at a rate of 1° C. per minute. While melting generally occurs at a sharply defined temperature, softening generally occurs over a range of temperatures.

In general, the polyesteramides will all be characterised by molecular weights corresponding to intrinsic viscosities (measured in m-cresol at 25° C.) of at least 0.2 and preferably at least 0.4, although there may be little advantage in exceeding 2.0.

While the invention is directed principally to polyesteramides the polymer chains of which contain only units having the srtuctures —O—(CH$_2$)$_5$—CO—,

—NH—(CH$_2$)$_6$—NH—

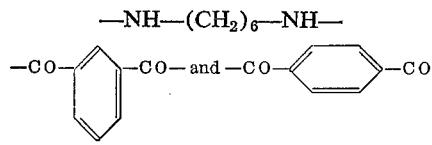

it also includes within its ambit polyesteramides the polymer chains of which are formed from the above units (which may be in random or block relationship) together with other units which may be introduced into the chain, for example by adding suitable copolymerisable monomers to the polymerisation mixture, and which may provide up to 10 units per 100 units of the polymer chain. Our polyesteramides will generally be found to consist of units having the structure —O—(CH$_2$)$_5$—CO—

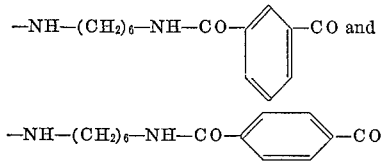

there being from 1 to 1000 of the latter units for every 50 ester units in the polymer chain.

For moulding materials it is particularly preferred that the ratio of ester units to the total number of diamine and dicarbonyl units is from 5:8 to 7:8, in other words the ratio of ester units to diamide units is from 5:4 to 7:4. It is preferred that the ratio of

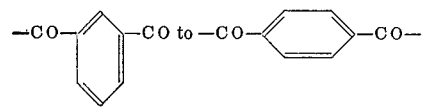

be in the range 4:1 to 1:4.

Our polyesteramides are derived notionally from ε-caprolactone, the diamine NH$_2$—(CH$_2$)$_6$—NH$_2$ and the diacids

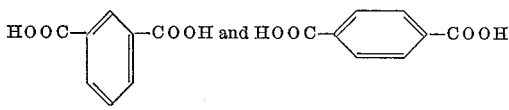

They may be formed in a number of ways but particularly:

(1) by reacting ε-caprolactone with the diamine and the dicarboxylic acids under conditions such that in the absence of the lactone the diamine and diacids would polycondense to high molecular weight polyamide (i.e. having a molecular weight of at least 5000);

(2) by reacting ε-caprolactone with the diammonium dicarboxylate salts formable from the diamine and diacids of (1), the conditions being such that in the absence of lactone, the salts would polymerise to high molecular weight polyamide as defined in (1) or (3) by reacting ε-caprolactone or its polymer with the molten polyamide formed from the diamine and the diacids of (1).

In all these recaitons, the lactone may be replaced by any other compound which will ultimately yield in the macromolecular chains of the polymer so produced units of the structure —O—(CH$_2$)$_5$—CO—; e.g., 6-hydroxy caproic acid, 6-acyloxy caproic acid and esters, particularly lower alkyl esters, of these acids. By lower alkyl, we mean linear alkyl containing from 1 to 6 carbon atoms. Similarly, the diamine and diacids may be replaced by polycondensable derivatives thereof.

The particular reaction is chosen to suit the starting materials but method (2) is generally preferred because of its flexibility.

Reactions (1) and (2) are generally effected by heating the components together and in the first reaction it is essential that the diamine and the mixture of diacids are used in equimolar or substantially equimolar amounts; i.e. the concentration of neither one exceeding the other by more than 2 and preferably 0.5 mole percent. If the concentration of either component exceeds the other by much over 2 mole percent only low molecular weight products are obtained, generally in the form of viscous liquids, oils, waxy materials or friable solids which have little or no intrinsic strength and are useful only e.g. as plasticisers or intermediates in the formation of high polymers. These form no part of our invention which is only concerned with polymers which are solids melting or softening above 60° C. and having measurable mechanical propreties such that they are particularly useful for conversion to unsupported films and moulded articles.

The temperature of the reaction in any of routes 1–3 will depend to some extent upon the choice of constituents and upon the molecular weight desired in the resultant polyesteramide. We have found that temperatures of from 150 to 300° C. are generally effective but the use of higher temperatures for extended periods of time (longer than a few minutes) may result in discoloured products. In our experience, consistently good results may be obtained from a process which involves a first stage wherein the reactants are melted together at a temperature of up to about 220° C. and a second stage wherein the product is subjected to a temperature above that of the first stage, and preferably of the order of from 210 to 270° C., until the polymerisation has achieved the desired conversion. It is advantageous but not necessary to effect the second stage under partial vacuum conditions and preferably at pressures below 1 mm. of mercury absolute. A rapid stream of inert gas, e.g. nitrogen, may be used to blow out low molecular weight by-products.

The presence of oxygen in the reaction is not advised and it is generally preferred to effect the polymerisation in an atmosphere of inert gas, conveniently nitrogen. Water may be tolerated but it is preferred to minimise its concentration and to use dry apparatus, anhydrous reagents and dry gas streams. An acidic compound may be added to the reaction mixture to aid polymerisation, if desired. Examples of such compounds are those normally used as catalysts for polycondensation reactions; e.g. sulphuric acid, phosphoric acid, benzene sulphonic acid, and p-toluene sulphonic acid.

While our invention is directed primarily to polymers formed of macromolecules containing units of the structure $-O-(CH_2)_5-CO-$, $-NH-(CH_2)_6-NH-$

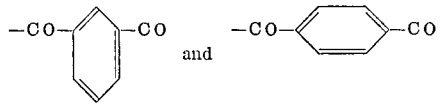
and we also include the addition to the ester generating compound and the amide-generating material (i.e. the mixture of the diamine and the diacids or the diammonium dicarboxylates or polyamide) of small amounts of other active materials, if desired. These may be monofunctional in order to cause chain termination or polyfunctional, e.g. difunctional or trifunctional, where it is desired to modify the polymer chains by the addition of units other than those specified as the essential units in the polymer chain. The use of tri- or higher polyfunctional units may lead to the production of cross-linked resins. The modifying compounds that may be added are any mono- or polyfunctional compounds known to be active in polycondensation reactions. Generally these are compounds containing one or more active hydrogen atoms, e.g. as in $-OH$, $-NH-$ and $-COOH$ groups, and they may be used in amounts to yield up to 10 units per 100 repeating units of the polymer chain.

On completion of the polymerisation reaction, the polymeric product may be removed and purified in any suitable manner. Normally, no special procedure is required and the product obtained after cooling may be used as such. The product may be modified with additives such as heat and light stabilisers, mould lubricants, release agents, pigments, dyes and fillers (e.g. fibrous glass, asbestos, ground glass, graphite, carbon black, $MoS_2$, metals and metal oxides) and blended with other plastic materials, natural or synthetic.

The invention is now illustrated but in no way limited by the following examples in which all parts are expressed as parts by weight.

Reduced viscosity is defined as the value obtained for $$\frac{t-t_0}{t_0.c.}$$

where $t=$flow time of a solution of the polymer at a concentration of "c." gms. decilitre$^{-1}$ in a solvent through a specified viscometer. $t_0=$flow time through the same viscometer of a similar volume of the solvent.

EXAMPLE 1

A copolymer composed of 60 moles percent of 6-oxycaproyl units, 20 moles percent hexamethylene isophthalamide units and 20 moles percent hexamethylene terephthalamide units was prepared by the reaction of ε-caprolactone (10.8 parts) with hexamethylene diammonium isophthalate (8.9 parts) and hexamethylene diammonium terephthalate (8.9 parts).

These reactants were melted together at 240° C. under nitrogen and maintained for 17 hours at this temperature to obtain a high molecular weight polymer.

The product obtained after cooling was a tough transparent solid from which a film was moulded at 150° C. under a pressure of 2000 lbs./sq. in. pressure. The film had the following mechanical properties:

Breaking stress: $3.8 \times 10^8$ dyne/cm.$^2$.
Initial modulus: $1.0 \times 10^{10}$ dyne/cm.$^2$.
Elongation at break: 68%.

The reduced viscosity of a 0.5% solution in m-cresol at 25° C. was 0.80 decilitre gm.$^{-1}$.

EXAMPLE 2

A copolymer containing 50 moles percent of 6-oxycaproyl units with 16.7 moles percent hexamethylene terephthalamide, 16.7 moles percent hexamethylene isophthalamide and 16.7 moles percent hexamethylene decane-1:10-dicarbonamide units was prepared by the reaction of ε-caprolactone (7.56 parts) with hexamethylene diammonium terephthalate (6.2 parts), hexamethylene diammonium isophthalate (6.2 parts) and hexamethylene diammonium dodecane-1:12-dioate (7.6 parts).

The reaction conditions were as described in Example 1 except that a reaction time of 24 hours was allowed.

The product obtained after cooling was a tough transparent material which crystallised slowly on standing. The crystalline material melted over the range 144–150° C. and the reduced viscosity of a 0.5% solution in m-cresol at 25° C. was 0.69 decilitre gm.$^{-1}$.

What is claimed is:

1. A polyesteramide which is a solid melting or softening above 60° C. and containing macromolecular chains consisting essentially of ester units of the structure $-O-(CH_2)_5-CO-$, diamine units of the structure $-NH-(CH_2)_6-NH-$ and dicarbonyl units of the structure

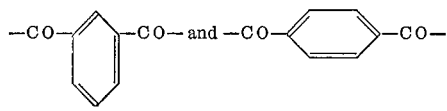

said units being in a random or block relationship, the ratio of ester units to the total number of diamine and dicarbonyl units in the macromolecular chains being from 50:2 to 50:2000.

2. A polyesteramide according to claim 1 which is a solid melting or softening above 60° C. and containing macromolecular chains consisting solely of ester units of the structure —O—(CH₂)₅—CO—, diamine units of the structure —NH—(CH₂)₆—NH— and dicarbonyl units of the structure

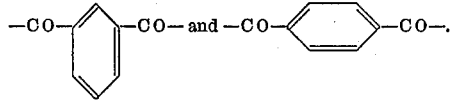

3. A polyesteramide according to claim 1 containing macromolecular chains consisting essentially of ester units of the structure —O—(CH₂)₅—CO— and diamide units of the structure

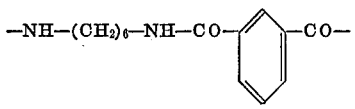

and

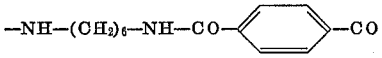

the ratio of ester units to diamide units in the macromolecular chains being from 50:1 to 50:1000.

4. A polyesteramide according to claim 1 in which the ratio of ester units to the total number of diamine and dicarbonyl units in the macromolecular chains is from 5:8 to 7:8.

5. A polyesteramide according to claim 3 in which the ratio of ester units to the number of diamide units in the macromolecular chains is from 5:4 to 7:4.

6. A polyesteramide according to claim 1 in which the ratio of

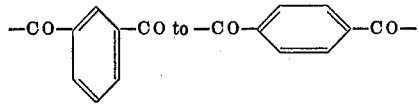

in the macromolecular chains is from 4:1 to 1:4.

7. A shaped article of a polyesteramide according to claim 1.

8. A film of a polyesteramide according to claim 1.

9. A process for the production of a polyesteramide which comprises the steps of (A) reacting (1) a compound selected from the group consisting of ε-caprolactone, 6-hydroxycaproic acid, 6-acyl oxycaproic acid and lower alkyl esters of said acids with (2) either (i) a polyamide formed of repeating units of the structure

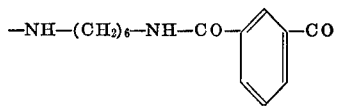

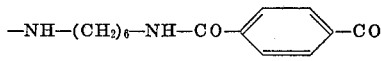

or (ii) material from which said polyamide may be formed, which material is selected from the group consisting of (a) substantially equimolar amounts of hexamethylene diamine and dicarboxylic acids of the structure

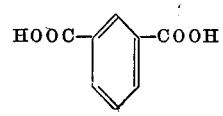

and

and (b) the corresponding mixture of hexamethylene diammonium isophthalate and hexamethylene diammonium terphthalate, the molar ratio of (1) to (2) being from 1:20 to 50:1, the reaction being effected by heating the mixture at a temperature of from 150° C. to 300° C. until polyesteramide melting or softening above 60° C. is obtained, and (B) recovering said polyesteramide.

10. A process according to claim 9 in which the reactants are first melted together at a temperature of up to 220° C. and are then subjected to a higher temperature within the range 210° C. to 270° C.

11. A process according to claim 10 in which the final part of the reaction is effected under a vacuum corresponding to an absolute pressure of less than 1 mm. of mercury.

References Cited

UNITED STATES PATENTS

| | | | |
|---|---|---|---|
| 2,547,113 | 4/1951 | Drewitt et al. | 260—75 |
| 2,946,769 | 7/1960 | Rose et al. | 260—75 |
| 3,475,385 | 10/1969 | Goodman et al. | 260—78 |

WILLIAM H. SHORT, Primary Examiner

L. L. LEE, Assistant Examiner

U.S. Cl. X.R.

260—75, 78.3